(12) United States Patent
Dhaussy et al.

(10) Patent No.: US 10,471,824 B2
(45) Date of Patent: Nov. 12, 2019

(54) CONTAINER COMPRISING A LIQUID TRAP

(71) Applicant: PLASTIC OMNIUM ADVANCED INNOVATION AND RESEARCH, Brussels (BE)

(72) Inventors: Franck Dhaussy, Margny-les-Compiegne (FR); Gwereg Paolini, Le Plessis Brion (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 141 days.

(21) Appl. No.: 15/323,831

(22) PCT Filed: Jul. 1, 2015

(86) PCT No.: PCT/FR2015/051803
§ 371 (c)(1),
(2) Date: Jan. 4, 2017

(87) PCT Pub. No.: WO2016/005678
PCT Pub. Date: Jan. 14, 2016

(65) Prior Publication Data
US 2017/0144537 A1    May 25, 2017

(30) Foreign Application Priority Data
Jul. 7, 2014 (FR) .................................. 14 56545

(51) Int. Cl.
*B01D 21/26* (2006.01)
*B60K 15/077* (2006.01)

(52) U.S. Cl.
CPC .... *B60K 15/077* (2013.01); *B60K 2015/0777* (2013.01)

(58) Field of Classification Search
CPC .......... B60K 15/077; B60K 2015/0777; B60K 2015/0344; B01D 21/0054; Y10T 137/86212
(Continued)

(56) References Cited

U.S. PATENT DOCUMENTS 2,052,540 A * 8/1936 Delano .............. B01D 21/0012
                                                    210/304
3,020,950 A * 2/1962 Schraivogel ......... B60K 15/077
                                                    137/549

(Continued)

FOREIGN PATENT DOCUMENTS

CN    103241121 A    8/2013
DE    28 30 443 A1    2/1979
(Continued)

OTHER PUBLICATIONS

International Search Report dated Oct. 14, 2015 in PCT/FR2015/051803 filed Jul. 1, 2015.

*Primary Examiner* — Andrew T Kirsch
*Assistant Examiner* — Elizabeth J Volz
(74) *Attorney, Agent, or Firm* — Oblon, McClelland, Maier & Neustadt, L.L.P.

(57) ABSTRACT

A container including sealed walls for containing a liquid, one of the walls forming a container bottom, the container bottom including a plurality of partitions defining therebetween areas contained consecutively inside one another, each of the areas communicating with an adjacent contained area via a passage including a threshold. The threshold of the passage between one area and an adjacent contained area is a low point of the area and a high point of the adjacent contained area, for any given area. The passage between the given area and the area in which the given area is contained, and the passage between the given area and the area contained within the given area are arranged in angular sectors (Continued)

defined by imaginary geometric angles opposed at the vertex thereof, the vertex being located in line with a lower-level area of the container, the angles having a size of less than 45°.

13 Claims, 3 Drawing Sheets

(58) Field of Classification Search
USPC .................. 220/563; 210/172.3, 304, 512.1; 137/549, 574, 590, 592
See application file for complete search history.

(56) References Cited

U.S. PATENT DOCUMENTS

| | | | |
|---|---|---|---|
| 4,048,069 A * | 9/1977 | Cuvillier | B01D 21/02 210/801 |
| 4,179,036 A * | 12/1979 | Pasini | B60K 15/077 137/574 |
| 4,453,564 A | 6/1984 | Bergesio | |
| 4,638,836 A | 1/1987 | Bailey | |
| 5,127,432 A | 7/1992 | Duhaime et al. | |
| 8,397,751 B1 * | 3/2013 | Chan | G11B 5/8408 137/590 |
| 2005/0194322 A1 * | 9/2005 | Palmer | B01D 21/0045 210/715 |
| 2007/0221570 A1 * | 9/2007 | Aregger | B01D 21/0054 210/512.1 |
| 2011/0303689 A1 | 12/2011 | Smirra | |

FOREIGN PATENT DOCUMENTS

| | | |
|---|---|---|
| DE | 28 47 117 A1 | 5/1980 |
| FR | 2 533 867 A1 | 4/1984 |
| JP | 2008-80945 A | 4/2008 |
| KR | 1998-027991 U | 8/1998 |
| KR | 2000-0008264 A | 2/2000 |

* cited by examiner

CONTAINER COMPRISING A LIQUID TRAP

The present invention relates to containers used in the motor industry in particular. These containers incorporate a multitude of associated technical equipment to manage distribution of the fluids present in the container in accordance with the vehicle's needs. These fluids are preferably in liquid form, and may be fuel but also liquids used by exhaust gas pollution control systems such as urea.

More particularly the invention relates to containers having an outlet opening in the bottom. The fluid present in the container flows through this outlet in the direction of the vehicle's controls under the effect of gravity or again through the action of an extraction pump. This outlet is generally located at a low point in the container.

The liquid present in the container is also affected by the vehicle's acceleration or inclination movements. As a result the level of liquid above the outlet can vary significantly, giving rise to loss of prime in the extraction means while the container still contains a sufficient reserve of useful liquid above the low quantity warning level.

This tends to become worse when the base of the container is flat or almost flat, which is the case when it is desired to design a container occupying a small outside volume.

The object of the invention is to provide an original solution to the problem set above, and to make it possible to maintain a volume of liquid above the outlet regardless of the vehicle's acceleration and inclination conditions.

The container according to the invention has leak-tight walls to contain the liquid, one of the walls forming a base of the container. This container is characterized in that the base of the container comprises a plurality of dividing walls delimiting zones between them which are enclosed successively one within the other, each of the zones being in communication with its adjacent enclosed zone through a passageway incorporating a threshold, and in which:

the threshold in the passageway between a zone and its adjacent enclosed zone constitutes a low point in that zone and a high point in the adjacent enclosed zone, and, for a given zone, the passageway between the zone in which the said zone is enclosed and the said given zone and the passageway between the said given zone and the zone enclosed in the said given zone are located in angular sectors bounded by imaginary geometrical angles (a) which are opposite to each other at the summit, this summit (s) being located above a zone at the lowest level in the container ($Z_4$), the said angles being less than 45°, preferably less than 30° and even more preferably less than 15°.

Thus the liquid present within the zones formed by the walls is trapped as if in a labyrinth and only a small portion of the liquid flows out of the zones defined by the partition walls when the container is inclined or is affected by accelerations, in particular when the total volume present in the container is close to the low limit.

The container according to the invention may also include insulation or the following characteristics in combination:

Within a given zone, an average gradient between the threshold in the passageway to the adjacent zone in which the said zone is enclosed and the threshold in the passageway to the adjacent zone enclosed within the said zone is between 0.5° and 5°.

The number of zones and the arrangement of passageways between the zones is designed to retain a reserve volume of a predetermined size when the bottom wall of the container is inclined at an angle of between 14° and 20° to the horizontal.

Zones are delimited by at least one continuous partition wall comprising two ends defining a single passageway.

An outlet opening is located in the lowest zone, which is the zone which is enclosed within all of the zones at the same time and forms the zone at the lowest level in the container.

The threshold in the passageway communicating with the zone at the lowest level of the container comprises the lowest point of all the thresholds in each of the passageways.

When the total volume present in the container reaches a given low limit the liquid flows by gravity to the zone at the lowest level of the container passing from one zone to another through the passageways made between each of the zones.

The height of the partition walls in relation to the bottom wall of the container increases in proportion to their distance from the outlet.

The outlet is connected to a pump for extracting the liquid present in the container.

The invention will be better understood from a reading of the appended figures that are provided by way of example and are not in any way limiting, in which:

FIG. 1 shows the partition wall at the bottom of the container viewed from the inside.

Under conditions of use this container is intended to hold a liquid such as for example fuel or urea. The container is located in a vehicle in such a way that the liquid flows by gravity towards a low point where there is an outlet 22. This outlet 22 may be incorporated in the wall of a technical module 20 comprising an extraction pump 21. Bottom wall 10 of the container and the wall of technical module 20, here combined with wall 10 of the container, are therefore arranged substantially horizontally when the vehicle is travelling or is parked on ground which is itself horizontal.

Partition walls $C_1$, $C_2$, $C_3$, which rise towards the inside of the container, substantially perpendicularly to the bottom wall of the container, surround module 20 delimiting zones $Z_1$, $Z_2$, $Z_3$, $Z_4$ enclosed successively within each other. Thus, zone $Z_1$ contains zone $Z_2$, which contains $Z_3$, which itself contains zone $Z_4$. For the purposes of the description which follows, the zones will be ordered in succession, $Z_1$ being the lowest ranking zone and $Z_4$ being the highest-ranking zone in the embodiment supporting this description. Obviously the number of zones and partition walls is not limiting.

Each of the zones communicate with the adjacent zones in which they are enclosed through passageways made in the partition wall acting as a barrier between the two adjacent zones. Thus zone $Z_1$ communicates with higher-ranking zone $Z_2$ through passageway $P_{12}$, zone $Z_2$ communicates with zone $Z_3$ through passageway $P_{23}$, and zone $Z_4$ communicates with zone $Z_3$ through passageway $P_{34}$. The number of passageways between adjacent zones is preferably no more than one or two passageways.

Technical module 20 comprising extraction pump 21 is located in zone $Z_4$ which is the highest-ranking zone simultaneously enclosed in all the lower-ranking zones. Through its construction this zone is the lowest zone of all the zones.

Figure 1:
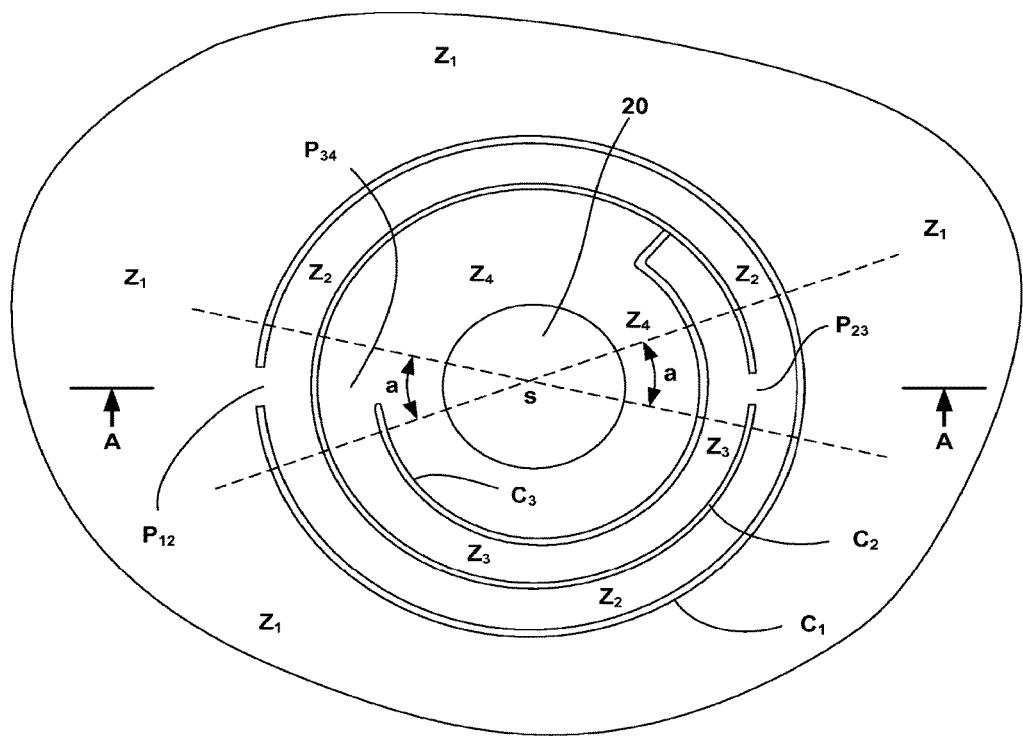
FIG. 1 shows a view from above of the bottom of the container illustrated in FIG. 1.

Passageway $P_{12}$ between zone $Z_1$ and zone $Z_2$ and passageway $P_{23}$ between zone $Z_2$ and zone $Z_3$ are each located in angular sectors which are here delimited by imaginary angles formed by the dashed lines illustrated in FIG. 1. These angles lie opposite to each other at their summit s. Summit s is located in zone $Z_4$ which is considered to be the lowest zone in the container. Between them the dashed lines form an imaginary angle a.

Considering zone $Z_3$ as the given reference zone, passageway $P_{23}$ between zone $Z_2$ and zone $Z_3$ and passageway $P_{34}$ between zone $Z_3$ and zone $Z_4$ are located in the angular sectors defined by the dashed lines respectively.

To achieve the performance desired from the invention the angle will be smaller than 45°.

The smaller the angle the better the liquid will be retained in the lowest zone of the container. Thus angle a will preferably be smaller than 30° and even more preferably smaller than 15°.

The height of the partition walls is relatively restricted, and in the case of a container containing some 20 liters, may usefully be between 5 cm and 15 cm. They should nevertheless be of a minimum height determined on the basis of a given volume, as will be seen below.

Figure 2:
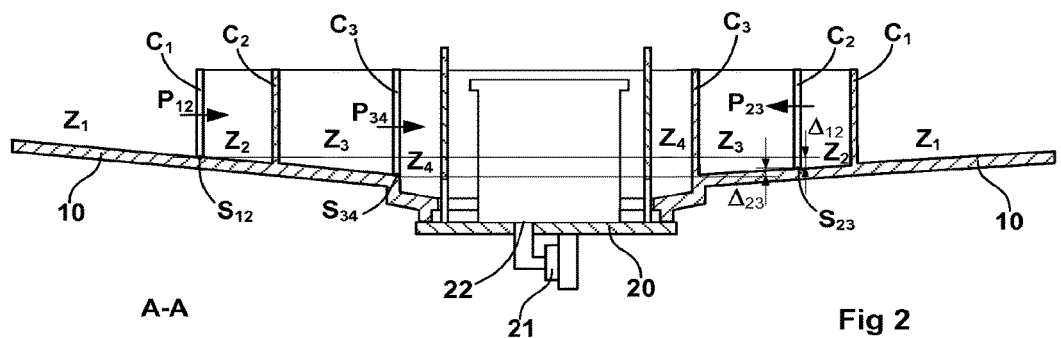
FIG. 2 shows a diagrammatical view in cross-section of the bottom of a container according to a first embodiment.
Figure 3:
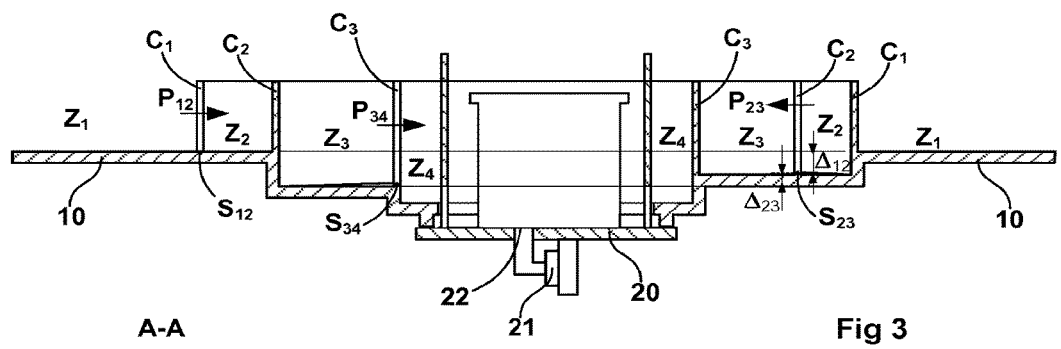
FIG. 3 shows a diagrammatical view in cross-section of the bottom of a container according to a second embodiment.

With reference to FIGS. 2 and 3, it will be seen that the passageways between two zones take the form of a threshold ($S_{12}$, $S_{23}$, $S_{34}$) located in the wall of the container. In accordance with the invention matters are arranged so that the threshold in the passageway between a zone and an adjacent enclosed higher-ranking zone constitutes a low point of the said zone and a high point in the adjacent higher-ranking enclosed zone. Thus, threshold $S_{12}$ constituting the threshold in passageway $P_{12}$ between zone $Z_1$ and zone $Z_2$ constitutes a low point in zone $Z_1$ and a high point in zone $Z_2$. Likewise, threshold $S_{23}$ which constitutes the threshold in passageway $P_{23}$ is a low point in zone $Z_2$ and a high point in zone $Z_3$. Finally, threshold $S_{34}$, forming the threshold in passageway $P_{34}$, constitutes a low point in zone $Z_3$ and a high point in zone $Z_4$.

The concept of high point and low point is here considered on the basis of the height of these points in relation to a plane substantially parallel to the plane formed by the bottom wall of the container or, more specifically, the horizontal plane when the vehicle in which the container is fitted is itself parked on a perfectly horizontal plane.

With reference to these geometric references, the high point of a zone is considered to be the point of maximum elevation, and the low point of a zone the point of minimum elevation in the zone. Thus threshold $S_{12}$ is higher than threshold $S_{23}$ by a value $\Delta_{12}$, and threshold $S_{23}$ is higher than threshold $S_{34}$ by a value $\Delta_{23}$.

This particular arrangement enables the liquid to flow by gravity from one zone to another passing through successive passageways $P_{12}$, $P_{23}$ and $P_{34}$.

Those skilled in the art will readily understand the need for no local high points to be left within a particular zone in order to prevent the formation of retaining pockets in which the liquid can accumulate in an undesired manner.

When the vehicle is parked on a horizontal surface the flow of liquid between the inlet passageway to a zone and the outlet passageway therefrom takes place along a channel formed by the partition walls delimiting the zone and the wall of the bottom of the container.

The partition walls bound a labyrinth in which the liquid flows towards lowest zone $Z_4$, when the bottom wall of the container is located substantially horizontal, and threshold $S_{34}$ leading to lowest zone $Z_4$ is the threshold having the lowest elevation in relation to the inlet thresholds of the lower ranking zones.

Bottom wall 10 of the container may be configured, as illustrated in FIG. 2, in such a way as to form a continuous gradient orientated substantially in the direction of the higher-ranking zone, corresponding to the lowest zone where outlet 22 is located corresponding to the inlet point to extraction pump 21.

The container wall may also be configured in such a way as to form a ramp having a continuous gradient within each zone running from the inlet threshold to the zone to the outlet threshold towards the enclosed adjacent higher-ranking zone.

Alternatively, as illustrated in FIG. 3, the passageway from one zone to the adjacent enclosed zone may be in the form of successive steps of non-zero height. The bottom wall of the container then remains substantially horizontal within each of the zones.

All these adaptations may be made without great difficulty when the container is constructed by molding, or more easily again by the injection molding of a thermoplastic material.

An average gradient calculated on the basis of the height difference between the inlet threshold and the outlet threshold of a zone ($\Delta_{12}$, $\Delta_{23}$) and the shortest path which has to be followed by the liquid when flowing by gravity from the inlet passageway to the zone to the outlet passageway from the zone are determined. This average gradient is preferably between 0.5° and 5°.

The partition walls arranged in this way have two quite distinct functions.

When the quantity of liquid present in the container is still above the lower limit, the liquid level is generally higher than the level of the partition walls. The liquid present in the container flows directly towards outlet 22 of the container where the inlet to the pump is located. However, when the vehicle is affected by strong longitudinal or transverse accelerations movements of liquid within the container are likely to expose the outlet, causing the pump to lose prime. The partition walls have the effect of slowing down these transfers of liquid and maintaining a minimum quantity of liquid in zone $Z_4$ where the outlet is located, so that there is a feed to the pump at all times.

It is therefore useful to limit the number and width of the passageways between two zones so as to limit the transfer flows between one zone and another. Good results are obtained by providing at most two passageways between two adjacent zones and limiting the width of the passageways to the height of the partition walls.

In this respect, it has proved useful to separate two adjacent zones by a continuous partition wall comprising two ends bounding a passageway between these two zones, as in the case of partition wall $C_1$ between zone $Z_1$ and zone $Z_2$, the two ends of which delimit passageway $P_{12}$, and for partition walls $C_2$ and passageway $P_{23}$ between zones $Z_2$ and zones $Z_3$.

Figure 4:
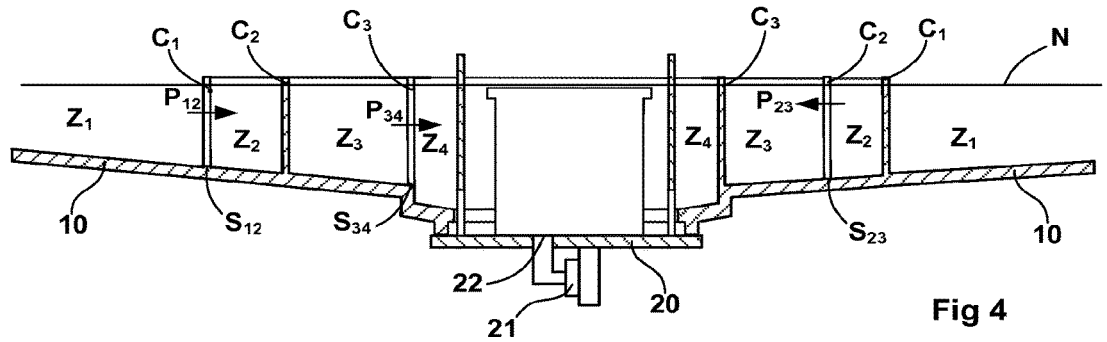
FIGS. 4, 5 and 6 illustrate positions of the container containing a quantity of liquid close to the lower limit when the container is inclined in given angular positions.
Figure 5:
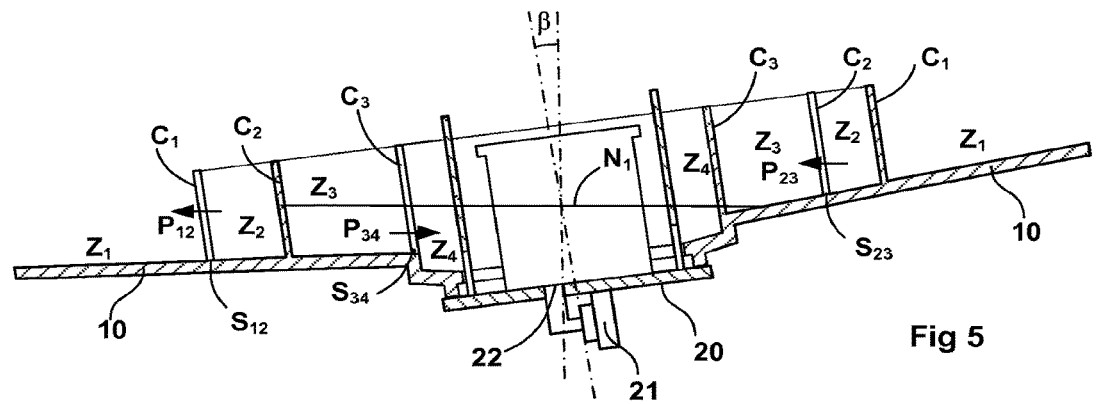
Figure 6:
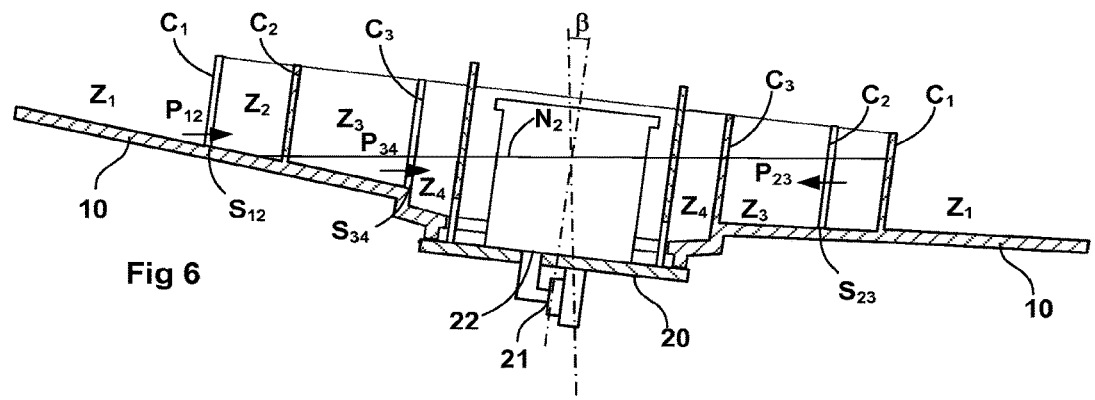

The second function of the partition walls, illustrated in greater detail in FIGS. 4, 5 and 6, is to act as a trap for liquid and to maintain a reserve volume in the container when the vehicle is in an extremely inclined condition. This function is particularly important when the vehicle's container contains only a small quantity of liquid or when this volume reaches a particular lower limit, and when the vehicle is parked in an inclined position.

The liquid present in the container is then concentrated in one part of the container and the level of liquid present in lowest ranking zone $Z_1$ is located at a level below the level of threshold $S_{12}$ in passageway $P_{12}$ towards zone $Z_2$ adjacent to zone $Z_1$ which is enclosed within the latter. This liquid will therefore no longer flow between these two zones by gravity.

When the vehicle is restarted it will then be necessary to have a minimum quantity of fuel or urea to cover the distance beyond which the vehicle will again be travelling on a horizontal surface.

The purpose of the partition walls is then to trap a sufficient quantity of liquid to ensure that it can set off in this way. This quantity of liquid is designated the reserve volume.

FIG. 4 illustrates the situation in which the container is in a substantially horizontal position and only contains a minimum quantity of liquid corresponding to the lower limit for the liquid level. The level N of the liquid remaining within the container is illustrated by a horizontal line. There is still a normal feed to pump 21.

When the vehicle, and therefore the container, is parked on ground inclined at an angle β with respect to the horizontal, some of the liquid (not shown) flows into zone $Z_1$ below the level of threshold $S_{12}$. The liquid trap formed by the partition walls makes it possible to retain a minimum quantity of liquid above outlet 22 in such a way that there is a feed to extraction pump 21 under these extreme conditions. These levels are shown by lines $N_1$ and $N_2$ in FIGS. 5 and 6.

It will be noted that, depending upon the direction of inclination of the container, the liquid present within the walls may escape through a passageway, as illustrated in FIG. 5, where all of the liquid present in zone $Z_2$ escapes via passageway $P_{12}$.

By direction of inclination is meant the direction in which the vehicle is inclined, that is forward or rearward, or to one side or the other, or in any position between these directions. When the vehicle is inclined with respect to the horizontal, this means that the inclination must be considered to be in any direction, and that the direction substantially perpendicular to the bottom of the container is located within a given solid angle β about the vertical direction, as illustrated in FIGS. 5 and 6.

It is then arranged that the reserve volume trapped by the walls of the liquid trap is larger than the specified given volume fixed by the vehicle manufacturer's recommendations when the vehicle is inclined in relation to the vertical direction at a solid angle β of between 14° and 20° and the total volume present in the container has reached the lower limit. More specifically, this reserve volume is defined as being the volume which is capable of flowing by gravity towards outlet 22 located in lowest ranking zone $Z_4$ when the vehicle is inclined at an angle β to the horizontal and the total volume of liquid present in the container has reached its lower limit.

This reserve volume will be determined by the number of zones and therefore the number of partition walls, the height of the partition walls and the respective positions of the inlet and outlet passageways between one and another.

Preferably, the passageways are arranged in an equally distributed manner about outlet 22 from the container, which means that in the plane of the bottom wall of the container the angular differences between the passageways with respect to outlet 22 should be substantially constant. Where there are two passageways these two passageways will be located substantially at diametrically opposite points in relation to outlet 22; where there are three passageways the passageways will be substantially located at 120° to each other around the outlet, four passageways at 90°, and so on. This arrangement also encourages a flow of liquid between the zones closest to outlet 22 connected to the extraction pump.

Thus, passageway $P_{12}$ between outer zone $Z_1$ and adjacent enclosed immediately higher ranking zone $Z_2$ and passageway $P_{23}$ between zone $Z_2$ and zone $Z_3$ should not be allowed to be located opposite each other, so as to prevent zones $Z_2$ and $Z_3$ from emptying simultaneously when the vehicle is inclined in the direction of these two passageways.

Those skilled in the art will therefore adjust the position of the passageways, calculating the residual volume trapped in each of the zones, and will arrange matters so that this volume is greater than or equal to the predetermined reserve volume in all directions in which the container is inclined as determined by the angular values indicated above, and that it can flow by gravity towards outlet 22 located in lowest zone $Z_4$.

If necessary, the height of the partition walls can be locally increased, in particular the height of the partition walls furthest from outlet 22 of the liquid trap.

It may also be useful to increase the number of partition walls. However, too many partition walls have the effect of trapping a non-negligible volume in the lower ranking zones of the liquid trap, in particular inclination configurations, without that volume being able to flow towards the higher-ranking zones close to the zone in which the outlet is located. In this respect, partitioning which makes it possible to delimit four to five zones appears to constitute a good compromise.

In conclusion it will be commented that designers of this part of the container are allowed great freedom to adjust the number and shape of the partition walls while remaining within the context of the teaching of the present invention.

The invention claimed is:
1. A container comprising:
   leak-tight walls for containing a liquid, one of the walls forming a bottom of the container;
   wherein said bottom wall of the container comprises a plurality of partition walls rising towards the inside of the container, bounding zones between them successively enclosed one within the other, each of the zones being in communication with an adjacent enclosed zone through a passageway made in the partition wall comprising a threshold located on the wall of the container;
   wherein the threshold in the passageway between a zone and an adjacent enclosed zone constitutes a low point in the zone and a high point in the adjacent enclosed zone; and
   wherein for a given zone, the passageway between the given zone and the zone in which the given zone is enclosed and the passageway between the given zone and the zone enclosed in the given zone are arranged within angular sectors bounded by imaginary geometrical angles which are opposite to each other at a summit, the summit being located at the lowest level zone in the container, the angles being less than 45°.
2. The container according to claim 1, wherein the angles are less than 30°.
3. The container according to claim 1, wherein the angles are less than 15°.

4. The container according to claim 1, wherein within a given zone an average gradient between the threshold in the passageway to the adjacent zone in which the zone is enclosed and the threshold in the passageway to the adjacent zone enclosed in the zone is between 0.5° and 5°.

5. The container according to claim 4, wherein the bottom wall is configured in such a way as to form a ramp having a continuous gradient within each zone running from the inlet threshold to the zone to the outlet threshold towards the enclosed adjacent zone.

6. The container according to claim 4, wherein the passageway from one zone to the adjacent enclosed zone may be in the form of successive steps of non-zero height, such that the bottom wall of the container remains substantially horizontal within each of the zones.

7. The container according to claim 1, wherein a number of zones and arrangement of the passageways between the zones is adjusted to retain a reserve volume of a predetermined amount when the bottom wall of the container is inclined at an angle of between 14° and 20° to the horizontal.

8. The container according to claim 1, wherein at least one zone is bounded by at least one continuous partition wall comprising two ends defining a single passageway.

9. The container according to claim 1, wherein an outlet is located in the zone which is simultaneously enclosed within all the zones, forming a lowest zone in the container, the outlet forming a lowest point in the container.

10. The container according to claim 9, wherein the threshold in the passageway communicating with the lowest zone in the container constitutes the lowest point of all the thresholds in each of the passageways.

11. The container according to claim 9, wherein when total volume present in the container reaches a given lower limit the liquid flows by gravity to the lowest zone in the container by passing from one zone to another through the passageways provided between each of the zones.

12. The container according to claim 9, wherein height of the partition walls in relation to the bottom wall of the container increases in proportion to their distance from the outlet.

13. The container according to claim 9, wherein the outlet is connected to an extraction pump extracting the liquid present in the container.

\* \* \* \* \*